United States Patent Office 3,147,272
Patented Sept. 1, 1964

3,147,272
METHOD OF PREPARING PARTIALLY REDUCED ORGANIC COMPOUNDS
Herbert C. Brown, 1840 Garden St., West Lafayette, Ind.; Richard F. McFarlin, 34 Narragansett Drive, Ladue, Mo.; and Bookinkere C. Subba Rao, 1098/10, Flat No. 4, Model Housing Colony, Shivaji Nagar, Poona 5, India
No Drawing. Filed Aug. 18, 1959, Ser. No. 834,376
19 Claims. (Cl. 260—297)

This application is a continuation-in-part of our application Serial No. 621,197, filed November 9, 1956 and now abandoned.

This invention relates to methods of preparing partially reduced organic compounds, such for example as preparing (1) a compound having an aldehyde group by reducing a compound having an acid halide, tertiary amide or nitrile group, (2) a compound having an aldehyde group and an acid halide group or two aldehyde groups by reducing a compound having two acid halide groups, (3) a compound having an aldehyde group and one or more other groups selected from aldehyde, ketone, ester, tertiary amide, nitrile, nitro, unsaturated carbon to carbon groups, etc. by reducing a compound having an acid halide group together with one or more of such other selected groups, or (4) a compound having an alcohol group together with an ester or nitrile group by reducing a compound having an aldehyde or ketone group together with an ester or nitrile group. More particularly, the invention relates to methods of preparing partially reduced organic compounds by reacting the compound to be reduced with an aluminohydride having the formula $MAlH_x(OR)_y$ where M is an alkali metal, such as sodium, potassium or lithium, R is an alkyl, cycloalkyl, aryl or alkaryl radical such as a methyl, ethyl, n-propyl, n-butyl, n-amyl, n-dodecyl, isobutyl, t-butyl, t-amyl, cyclohexyl, benzyl, phenyl and p-t-butylphenyl radical, $x$ is a whole number from 1 to 2 and $y$ is a whole number from 2 to 3. In general, an aluminohydride of the above formula where R is an alkyl radical having not more than 12 carbon atoms is preferred. When an aluminohydride of the above formula where R is alkaryl is used, it is preferred that the aryl portion thereof be phenyl and the alkyl portion thereof contain not more than six carbon atoms.

Lithium aluminum hydride, $LiAlH_4$, is a useful reducing agent which has been widely adopted for organic hydrogenations. However, it is an exceedingly powerful reducing agent and is difficult to use when it is desired to reduce one reducible group in the presence of another or where it is desired to reduce a given group to an intermediate stage, such as the reduction of an aldehyde group to an alcohol group in the presence of an ester or nitrile group or the reduction of an acid halide group to an aldehyde group. Consequently, it is difficult to obtain any appreciable yield of the desired product in the reduction of p-carbethoxybenzaldehyde. Similarly, the reduction of benzoyl chloride results in further reduction of the probable first reduction product, benzaldehyde. Attempts to reduce N,N-dimethylacid amides to aldehydes by means of lithium aluminum hydride have given very poor yields. For example, M. Mousseron, R. Jacquier, M. Mousseron-Canet and R. Zagdoun, as reported in Bull. Soc. Chim. France (5) 19, 1042 (1952), obtained cyclohexanecarboxaldehyde in only 5% yield by the reduction of N,N-dimethyl cyclohexanecarboxamide. Only by the use of very special amide groups, such as $—N(C_6H_5)_2$ and $—N(CH_3)C_6H_5$, has it been possible to realize reasonable yields.

We have discovered that the above mentioned aluminohydrides having the formula $MAlH_x(OR)_y$ are valuable reagents for effecting partial reductions of organic compounds. For example, acyl halides may be reduced to aldehydes by adding a solution of the aluminohydride to a solution of the acyl halides in an inert solvent therefor. Usually, the amount of aluminohydride used should be sufficient to reduce the acid halide group but insufficient to effect substantial reduction of the aldehyde produced. Thus, the amount of the aluminohydride having the formula $MAlH_x(OR)_y$ used is not substantially more than one mole for each $z$ moles of the organic compound to be reduced where $z$ represents the same number as $x$. Likewise, tertiary amides or nitriles may be partially reduced to aldehydes. In a similar manner, the acid halide group of a compound may be reduced to an aldehyde group without reducing other reducible groups present in the compound, such as aldehyde, ketone, ester, tertiary amide, nitrile, nitro or unsaturated carbon to carbon groups.

The aluminohydrides used in the practice of the present invention can be prepared by adding the theoretical quantity of the hydroxy compound, ROH, to an alkali metal aluminum hydride, preferably in a suitable solvent, such as ethyl ester, tetrahydrofuran or dimethylether of diethylene glycol as illustrated by the following equations:

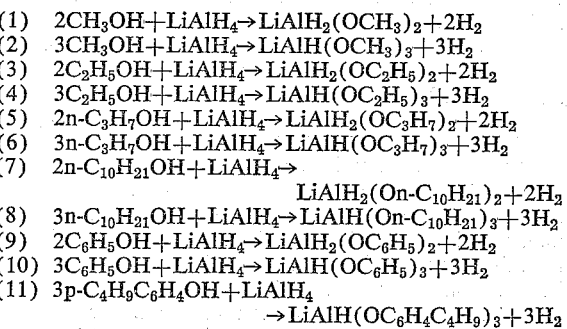

Where the RO group can be prepared by reduction of an aldehyde or ester, the aluminohydride used in the practice of the invention can be synthesized by treatment of the solution of the alkali metal aluminum hydride with the calculated quantity of aldehyde or ester, as illustrated by the following equations:

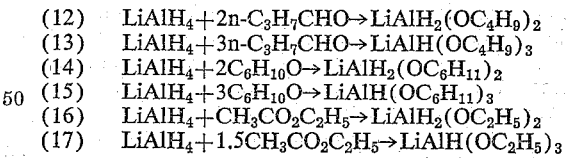

The reactions illustrated by Equations 1 to 17 above are quite exothermic. Consequently, they should be carried out with an efficient condenser to minimize volatilization of the solvent, or with cooling for the same purpose. Otherwise, the temperature of preparation is not important. Temperatures as low as minus 80° C., 0° C. and ambient room temperatures have been utilized with no significant difference in results. Elevated temperatures can be used, but offer no significant advantages.

The aluminohydrides used in the practice of the invention can also be synthesized by utilizing an exchange reaction between $LiAlH_4$ and $LiAl(OR)_4$ as illustrated by the equations:

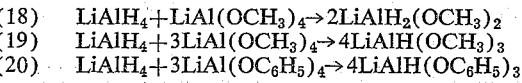

These aluminohydrides also can be synthesized by heating freshly distilled aluminum compounds having the formula Al(OR)$_3$ with an alkali metal hydride at elevated temperatures as illustrated by the equations:

(21)   $LiH+Al(OC_2H_5)_3 \rightarrow LiAlH(OC_2H_5)_3$
(22)   $LiH+Al(Ot-C_4H_9)_3 \rightarrow LiAlH(Ot-C_4H_9)_3$
(23)   $LiH+Al(OC_6H_5)_3 \rightarrow LiAlH(OC_6H_5)_3$ In the reactions illustrated by Equations 1 to 23 above the LiAlH$_4$ and LiH can be replaced by the corresponding sodium or potassium compounds as illustrated by the equations:

(24)   $NaAlH_4+3t\text{-}C_4H_9OH \rightarrow NaAlH(Ot\text{-}C_4H_9)_3+3H_2$
(25)   $NaAlH_4+CH_3CO_2C_2H_5 \rightarrow NaAlH_2(OC_2H_5)_2$
(26)   $NaH+Al(OC_4H_9)_3 \rightarrow NaAlH(OC_4H_9)_3$
(27)   $LiAlH_4+3NaAl(OCH_3)_4$
　　　　　　$\rightarrow 3NaAlH(OCH_3)_3+LiAlH(OCH_3)_3$ The following examples are typical of the preparation of the aluminohydrides used in the practice of the invention.

*Preparation of Lithium Dimethoxyaluminohydride*

In a 300 ml. flask fitted with a stirrer, pressure equalized dropping funnel, and a Dry Ice condenser, was added 205 ml. (52.5 mmoles) of a clear solution of lithium aluminum hydride in ether. To the flask was added 105 mmoles of methanol. The solution was filtered to remove traces of solid and the ether removed on the steam bath. Lithium dimethoxyaluminohydride was obtained as a white solid. Its analysis for lithium, aluminum and active hydrogen corresponded to the formula, LiAlH$_2$(OCH$_3$)$_2$. The compound is readily soluble in ether, tetrahydrofuran and dimethylether of diethylene glycol. The yield was almost quantitative.

*Preparation of Lithium Trimethoxyaluminohydride*

The procedure was identical with that of the previous example, but a total of 157 mmoles of methanol was added. The solution was clear up to the point where two molar equivalents of methanol was added. Addition of the third molar equivalent resulted in a white precipitate. The precipitate was collected on a filter (protected from moinsture) and excess solvent removed under vacuum. Lithium trimethoxyaluminum hydride as a white solid, analyzed for LiAlH(OCH$_3$)$_3$, in 90% yield. Although insoluble in ether, the compound is readily soluble in tetrahydrofuran and dimethylether of diethylene glycol.

*Preparation of Lithium Diethoxyaluminohydride*

The apparatus used was identical with that used in the previous examples. However, to the lithium aluminum hydride solution in ether was added 52.5 mmoles of ethyl acetate. The ether was removed on the steam bath, the last traces being pumped off under vacuum. Lithium diethoxyaluminohydride was obtained as a white solid, easily soluble in ether, tetrohydrofuran and the dimethylether of diethylene glycol.

*Preparation of Lithium Tri-t-Butoxyaluminohydride*

The apparatus used was identical with that used in the previous examples. To the ether solution of lithium aluminum hydride was added 157 mmoles of t-butyl alcohol. The solution remained clear during the addition of the first and second molar equivalent of the alcohol, but a heavy white precipitate was observed with the third. (Additional t-butyl alcohol can be added, but no hydrogen is evolved at room temperature, indicating no further reaction.) The solid was recovered in quantitative yield. It analyzed for lithium tri-t-butoxyaluminohydride, LiAlH(Ot—Bu)$_3$. Although insoluble in ethyl ether, it is highly soluble in tetrahydrofuran and dimethylether of diethylene glycol.

*Preparation of Lithium Trimethoxyaluminohydride by Disproportionation*

Lithium tetramethoxyaluminohydride, LiAl(OCH$_3$)$_4$, is essentially insoluble in tetrahydrofuran. However, refluxing of 1 mole of lithium aluminum hydride to a suspension of 3 moles of lithium tetramethoxyaluminohydride in tetrahydrofuran results in the solution of the solid and the formation of a clear solution. Removal of the solvent yields a homogeneous product, lithium trimethoxyaluminohydride.

The aluminohydrides used in the practice of the invention are white solids. Like the parent compounds, MAlH$_4$, they are senstive to moisture. However, they are far more stable. Thus, lithium aluminum hydride undergoes decomposition at 150° C. to lithium hydride, aluminum and hydrogen, whereas the aluminohydrides of the invention are quite stable at that temperature. Samples of lithium diethoxyaluminohydride and lithium trimethoxyaluminohydride were heated in vacuo at 200° C. for several hours without apparent change. A sample of lithium tri-t-butoxyaluminohydride exhibited no change under this treatment, and could actually be sublimed unchanged at 280° C. under vacuo.

Although these aluminohydrides can be prepared and isolated and then used for effecting reductions, there are advantages in preparing them and utilizing them in situ. In this way, the necessity of handling reactive solids which are highly susceptible to atmosphere moisture is avoided. Consequently, our preferred procedure is to synthesize the desired aluminohydride by treating a solution of the alkali metal aluminum hydride in a suitable solvent with the calculated quantity of alcohol, aldehyde or ester. The reagent thus prepared in situ is directly utilized for the desired reduction.

The following examples are illustrative of reductions effected with aluminohydrides having the formula MAlH(OR)$_3$.

*Reduction of Acid Halides to Aldehydes*

Lithium tri-t-butoxyaluminohydride, 0.25 mole, was dissolved in 200 ml. of dimethylether of diethyleneglycol. This solution was added over a period of one hour to 45.3 grams (0.244 mole) of p-nitrobenzoyl chloride in 100 ml. of dimethylether of diethyleneglycol maintained at approximately minus 75° C. This mixture was permitted to warm to room temperature and then was poured on to crushed ice. The mixture was filtered and the solid pressed dry and extracted several times with 95% ethanol. Evaporation of the solvent yielded the crude product, M.P. 103–104° C. (29.4 grams, 80% yield). After recrystallization from aqueous ethanol, the pure aldehyde was obtained in the form of light tan crystals, M.P. 104–105° C. (25.4 grams, 69% yield).

Comparable yields of aldehyde are obtained even when the molecule contains other reducible groups, such as nitro, ester, nitrile groups, etc. The yields are lower with the tri-t-amyloxyaluminohydride and still lower with the triethoxyaluminohydride and trimethoxyaluminohydride.

Typical results are summarized in the following table:

| Acid chloride: | Yield, percent |
|---|---|
| Benzoyl | 81 |
| p-t-Butylbenzoyl | 77 |
| p-Toluyl | 78 |
| p-Chlorobenzoyl | 81 |
| m-Chlorobenzoyl | 76 |
| o-Chlorobenzoyl | 41 |
| p-Methoxybenzoyl | 60 |
| m-Methoxybenzoyl | 66 |
| p-Nitrobenzoyl | 84 |
| m-Nitrobenzoyl | 88 |
| o-Nitrobenzoyl | 77 |
| p-Cyanobenzoyl | 87 |
| p-Carbethoxybenzoyl | 48 |
| Terephthalyl | 82 |
| Isophthalyl | 77 |
| Nicotinyl | 69 |
| Cinnamoyl | 71 |

Acid chloride: Yield, percent
- d-Naphthoyl _____ 84
- β-Naphthoyl _____ 58
- Isobutyryl _____ 57
- Pivaloyl _____ 58
- Adipyl _____ 53
- Fumaryl _____ 59
- Cyclopropanecarboxyl _____ 42
- Cyclohexanecarboxyl _____ 56

*Reduction of Dimethylamides to Aldehydes*

The following procedure is typical.

A solution of 0.1 mole of the aluminohydride in 200 ml. of the solvent is added to 0.1 mole of the tertiary amide in 200 ml. of the same solvent at 0° C. After one hour at 0° C., the mixture is allowed to come to room temperature, hydrolyzed, and an aliquot removed for aldehyde analysis (with 2,4-dinitrophenylhydrazine). The results realized are shown in the following table in which THF represents tetrahydrofuran and diglyme represents the dimethylether of diethyleneglycol and in which Me, Et and i-Pr represent methyl, ethyl and isopropyl respectively:

| Amide | Reagent | Solvent | Aldehyde yield, percent |
|---|---|---|---|
| N,N-dimethylbenzamide | LiAlH(OMe)$_3$ | THF | 81 |
| Do | LiAlH(OMe)$_3$ | Diglyme | 91 |
| Do | LiAlH(OEt)$_3$ | Ether | 90 |
| Do | LiAlH(OEt)$_3$ | THF | 90 |
| Do | LiAlH(OEt)$_3$ | Diglyme | 93 |
| Do | LiAlH(O-i-Pr)$_3$ | Ether | 52 |
| Do | LiAlH(O-i-Pr)$_3$ | Diglyme | 63 |
| N,N-dimethylbutyramide | LiAlH(OMe)$_3$ | do | 60 |
| Do | LiAlH(OMe)$_3$ | THF | 60 |
| Do | LiAlH(OEt)$_3$ | Diglyme | 90 |
| N,N-dimethylisobutryamide | LiAlH(OEt)$_3$ | Ether | 91 |
| N,N-dimethylpivalylamide | LiAlH(OEt)$_3$ | do | 92 |

*Reduction of Nitriles to Aldehydes*

Lithium triethoxyaluminohydride was synthesized in situ by adding either 3 moles of ethanol or 1.50 moles of ethyl acetate to one mole of lithium aluminum hydride in ether solution (1.3 m.) at 0° C. To this solution, maintained at 0° C., one mole of the nitrile was added. After one hour at 0° C., one-half volume of methanol was added to destroy residual unreacted hydride and give a homogeneous solution. The aldehyde yield is based on an analysis of an aliquot of the solution with 2,4-dinitrophenylhydrazine. The results are summarized in the following table:

Nitrile Aldehyde yield, percent
- n-Butyronitrile _____ 68
- n-Capronitrile _____ 69
- Isobutyronitrile _____ 81
- Cyclopropanecarbonitrile _____ 69
- Cyclohexanecarbonitrile _____ 76
- Benzonitrile _____ 96
- o-Tolunitrile _____ 87
- α-Naphthonitrile _____ 80
- o-Chlorobenzonitrile _____ 87
- p-Chlorobenzonitrile _____ 92
- Cinnamonitrile _____ 61

The following examples are illustrative of reductions effected with aluminohydrides having the formula $$MAlH_2(OR)_2$$

*Reduction of Dimethylamides to Aldehydes*

A solution of 20.6 g. (0.234 mole) of ethyl acetate in 250 ml. of anhydrous ether was added over a period of 2 hours to 200 ml. of a 1.17 m. solution of lithium aluminum hydride (0.234 mole) in ether, cooled in an ice-bath. The reagent solution thus prepared was added over a period of 30 minutes to a well-stirred solution of 60.6 g. (0.390 mole) of N,N-dimethylcyclohexanecarboxamide in 250 ml. of ether (0° C.). After 30 minutes at 0° C., the reaction mixture was refluxed gently for another 30 minutes, and hydrolyzed at 0° C. with 2 N sulfuric acid. The ether layer and extracts were separated, dried and distilled. The aldehyde, B.P. 76.5–77.5° at 48 mm. $n^{20}_D$ 1.4495, was isolated in a yield of 30.6 g.—71%.

Yields of aldehyde in the reduction of acyl dimethylamides by lithium diethoxyaluminohydride are shown in the following table:

| Acid | Yield of aldehyde, percent | |
|---|---|---|
| | with 2,4-dinitrophenylhydrazine | By isolation |
| n-Butyric | 90 | |
| n-Hexanoic | 80 | 67 |
| Lauric | 90 | |
| Isobutyric | 89 | |
| Pivalic | 75 | 63 |
| Cyclohexanecarboxylic | 85 | 71 |
| Cyclopropanecarboxylic | 78 | |
| α-Naphthoic | 81 | |
| o-Chlorobenzoic | 80 | 78 |
| o-Methoxybenzoic | 84 | |
| Nicotinic | 89 | |
| 10-undecenoic | 87 | |
| Ethylthioacetic | 69 | |

*Reduction of Acid Halides to Aldehydes*

Lithium aluminum hydride, 0.25 mole, was dissolved in 200 ml. of ethyl ether. To this solution was slowly added carefully dried t-butyl alcohol, 0.50 mole. The theoretical quantity of hydrogen was evolved. The resulting solution of lithium di-t-butoxyaluminohydride was added to a solution of 0.50 mole of benzoyl chloride in 200 ml. of ethyl ether at minus 80° C. and the mixture was permitted to warm up to room temperature. The reaction mixture was hydrolyzed and the ether solution was separated, dried and distilled. There was obtained a 52% yield of benzaldehyde.

Similarly, p-chlorobenzaldehyde, isobutyryl aldehyde, cyclohexane carboxylic aldehyde, stearyl aldehyde and oleyl aldehyde were prepared by the reduction of the acid chlorides by this procedure.

For this reduction, the di-t-butoxy derivative is preferred, but we have demonstrated the applicability of lithium di-t-amyloxyaluminohydride, lithium diethoxyaluminohydride and lithium diphenoxyaluminohydride.

*Reduction of Nitriles*

A solution of 0.25 mole of lithium aluminum hydride in ethyl ether was converted to the lithium diethoxyaluminohydride reagent by treatment with 0.25 mole of ethyl acetate. The resulting solution was added to 0.50 mole of benzonitrile in 200 ml. of ethyl ether. After one hour, the reaction product was hydrolyzed, and the ether solution dried and distilled. There was obtained an 88% yield of benzaldehyde.

In the same manner, p-chlorobenzaldehyde, α-naphthyl aldehyde, pivalic aldehyde, lauryl aldehyde and oleyl aldehyde were prepared in yields of 50 to 90%.

Although we prefer the use of diethoxyaluminohydride for these reductions, we have demonstrated the applicability of lithium di-n-butoxyaluminohydride, lithium di-n-hexoxyaluminohydride, lithium di-isobutoxyaluminohydride, lithium di-p-t-butylphenoxyaluminohydride and lithium diphenoxyaluminohydride.

We claim:

1. In a method for reducing an organic functional group selected from the class consisting of acid halide, tertiary amide, and nitrile groups which comprises contacting a compound containing a functional group selected from said class with an aluminohydride in an alert solvent therefor at a temperature sufficient to effect reduction of said functional group but insufficient to cause decomposition of any compound involved in the reaction, the improvement wherein said selected group is reduced to an aldehyde group by contacting said compound with an aluminohydride having the formula $MAlH_x(OR)_y$ where M is an alkali metal, R is a radical selected from the group consisting of lower alkyl, lower cycloalkyl, phenyl, and alkaryl where the aryl portion is phenyl and the alkyl portion contains not more than six carbon atoms, $x$ is a whole number from 1 to 2 and $y$ is a whole number from 2 to 3, the amount of said aluminohydride used having the formula $MAlH_x(OR)_y$ being not substantially greater than one mole per $z$ moles of said compound where $z$ is the same number as $x$.

2. The method as claimed by claim 1 wherein $x$ is one and $y$ is three.

3. The method as claimed by claim 1 wherein $x$ is two and $y$ is two.

4. The method as claimed by claim 2 wherein R is a lower alkyl radical.

5. The method as claimed by claim 3 wherein R is a lower alkyl radical.

6. The method as claimed by claim 4 wherein M is lithium.

7. The method as claimed by claim 4 wherein the selected reducible group is an acid halide group.

8. The method as claimed by claim 4 wherein the selected reducible group is a tertiary amide group.

9. The method as claimed by claim 4 wherein the selected reducible group is a nitrile group.

10. The method as claimed by claim 5 wherein M is lithium.

11. The method as claimed by claim 5 wherein the selected reducible group is an acid halide group.

12. The method as claimed by claim 5 wherein the selected reducible group is a tertiary amide group.

13. The method as claimed by claim 5 wherein the selected reducible group is a nitrile group.

14. The method as claimed by claim 7 wherein the aluminohydride is lithium tri-t-butoxyaluminohydride.

15. The method as claimed by claim 8 wherein the aluminohydride is lithium triethoxyaluminohydride.

16. The method as claimed by claim 9 wherein the aluminohydride is lithium triethoxyaluminohydride.

17. The method as claimed by claim 11 wherein the aluminohydride is lithium diethoxyaluminohydride.

18. The method as claimed by claim 12 wherein the aluminohydride is lithium diethoxyaluminohydride.

19. The method as claimed by claim 13 wherein the aluminohydride is lithium diethoxyaluminohydride.

References Cited in the file of this patent

Hess et al.: Angew. Chem., vol. 68 (1956), pages 438–439.

Brown et al.: Jour. Amer. Chem. Soc., vol. 78 (1956), page 252.